US008483097B2

(12) United States Patent
Farkas et al.

(10) Patent No.: US 8,483,097 B2
(45) Date of Patent: *Jul. 9, 2013

(54) METHOD OF GENERATING SPANNING TREES TO HANDLE LINK AND NODE FAILURES IN A NETWORK

(75) Inventors: János Farkas, Kecskemét (HU); Gábor Tóth, Szigetszentmiklós (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 370 days.

This patent is subject to a terminal disclaimer.

(21) Appl. No.: 12/889,636

(22) Filed: Sep. 24, 2010

(65) Prior Publication Data

US 2011/0026438 A1 Feb. 3, 2011

Related U.S. Application Data

(63) Continuation of application No. 12/089,228, filed as application No. PCT/SE2005/001502 on Oct. 11, 2005, now Pat. No. 7,804,791.

(51) Int. Cl.
*H04L 12/28* (2006.01)

(52) U.S. Cl.
USPC .............................. 370/256; 370/216; 709/252

(58) Field of Classification Search
USPC .................. 370/216–228, 254–258; 709/252
See application file for complete search history.

(56) References Cited

U.S. PATENT DOCUMENTS

| 6,940,825 | B2 | 9/2005 | Goldman et al. |
| 7,330,440 | B1* | 2/2008 | Bryant et al. ................. 370/254 |
| 2002/0167898 | A1 | 11/2002 | Thang et al. |
| 2004/0252634 | A1* | 12/2004 | Regan et al. ................. 370/216 |

FOREIGN PATENT DOCUMENTS

WO WO 2004/066568 A1 5/2004

OTHER PUBLICATIONS

Kvalebein A. et al. Fast Recovery from Link failures Using Resilient Routing Layers. Proceedings 10$^{th}$ IEEE Symposium on Computers and Communications Jun. 27-30, 2005. IEEE Computer Society. ISBN 0-7695-2373-0, pp. 554-560.

Hansen, A F et al. Resilient Routing Layers for Recovery in Packet Networks. Proceedings 2005. International Conference on Dependable Systems and Network. Jun. 28-Jul. 1, 2005. IEEE Computer Society. ISBN 0-7695-2282-3, pp. 238-247.

(Continued)

*Primary Examiner* — Pao Sinkantarakorn

(57) ABSTRACT

A method for generating spanning trees (ST1,ST2,ST3) in a network (NW2). The network has nodes (A-K) interconnected by links (L2) and the trees are used for handling link and node failures. For handling link failures there is for each link (L2) at least one tree (ST1,ST2) that does not include that link. For node failures there is for each node (A-K) at least one spanning tree (ST1-ST3) to which the particular node is connected by a single link (L2). The first spanning tree (ST1) connects all nodes (A-K) and from each node one link is left unconnected. The second tree (ST2) includes all nodes and all the unconnected links. None of the links is included in both the trees (ST1,ST2). If node B is broken, node A cannot communicate with nodes C and D so the third tree (ST3) is needed. The method has the advantage of giving a low number of trees also for big networks of any topology and can be implemented off-line.

14 Claims, 13 Drawing Sheets

OTHER PUBLICATIONS

Menth, M et al. Network Resilience Through Multi-Topology Routing. May 2004. [online] Retrieved from the internet: http://www3.informatik.uni-wuerzburg.de/TR/tr335.pdf.

Blin, et al. The First Approximated Distributed Algorithm for the Minimum Degree Spanning Tree problem on General Graphs. IEEE 2003. Proceedings of the International Parallel and Distributed Processing Symposium.

* cited by examiner

Internal leaf nodes are removed from $T_4$

Internal leaf nodes are removed from $T_5$

METHOD OF GENERATING SPANNING TREES TO HANDLE LINK AND NODE FAILURES IN A NETWORK

RELATED APPLICATIONS

This application is a continuation of U.S. patent application Ser. No. 12/089,228 filed Apr. 4, 2008, now U.S. Pat. No. 7,804,791 which is a §371 national stage filing of International Application No. PCT/SE2005/001502 filed on Oct. 11, 2005, the disclosures of which are fully incorporated herein by reference.

TECHNICAL FIELD OF THE INVENTION

The present invention relates to a method of generating spanning trees in a network.

DESCRIPTION OF RELATED ART

Networks, such as Ethernet networks, for exchanging information include nodes interconnected by links. A connection that is set up between a pair of end nodes in the network can suddenly fail due to a failure in a node or a link. Methods have been developed to detect the failing connection.

"Spanning Tree Protocol" [1] (STP) was the first resiliency method for Ethernet, which was mainly developed for avoiding loops to avoid circulation of broadcast messages. STP also provides path redundancy by the activation of unused links. In case of link failure, a former backup link is activated in order to reach the separated network segment. The construction of the spanning tree begins with the election of the root bridge among the bridges. The rest of the bridges calculate the shortest distance to the root bridge. The port providing this shortest path to the root bridge is the root port. The bridges exchange spanning tree control information in Bridge Protocol Data Unit (BPDU) messages. The main drawback of STP, used online, is its slow convergence. The failover time is in the order of ten seconds, typically from 30 to 60 seconds, and depends on the number of network devices. A further drawback of STP is that it is hardly controllable. That is, the first tree can be configured but the tree formed after a failure is not predictable.

"Rapid Spanning Tree Protocol" [2] (RSTP) was the next step in the evolution of Ethernet resiliency protocols. It keeps the terminology and most of the parameters same as in STP. The most important difference to STP is that the number of possible operational states of ports are reduced from five to three states. Furthermore, message handling in a port does not depend on the role it plays in the spanning tree. BPDUs remained in the same format, just a few changes were introduced, i.e. all bits of the flag byte are used. One of the drawbacks of STP is that non-root bridges only generate BPDUs when a BPDU arrives on their root port. As opposed to this, in RSTP every bridge generates so-called hello BPDUs in a predefined time interval, e.g. in every 2 seconds. Furthermore, a faster aging is applied for protocol information, i.e. it is immediately aged out if hellos are not received in three consecutive hello periods. Thus BPDUs are used as a keep-alive mechanism between bridges, which makes the recovery faster. The convergence time of RSTP is reduced to the order of seconds so it is still not applicable in carrier grade networks.

As ring topology plays an important role in optical networks, a special loop protection and resiliency approach was developed for this topology. It is called "Ethernet Automatic Protection Switching" (EAPS) [3]. In this approach there is a so-called Master node in the ring, which blocks data forwarding in one direction by blocking one of its ports. This port just listens to the periodic messages sent out in the other port, whose arrival in time shows normal operation. These messages do not arrive in case of a failure, so the Master activates the formerly blocked port. The failure can be also indicated by any of the nodes with the help of a special message. After the reparation, the Master again blocks the port. The achievable recovery time is around 50 milliseconds. There is no better architecture for ring topology, however, this approach cannot be applied in case of more complex topologies.

With the spreading use of Virtual LANs (VLAN) [4] it became obvious that the existing standard was not adequate as the same STP instance does not suit for all VLANs and a spanning tree per VLAN is not tractable. Therefore, "Multiple Spanning Tree Protocol (MSTP) [5] was developed by IEEE. MSTP merges the best features of RSTP and VLAN. The main improvement introduced by MSTP is that several VLANs can be assigned to a single spanning tree instance. These instances are independent of each other if there are more than one. The maximum number of spanning tree instances depends on the Ethernet switches; it can even reach a thousand instances. Thus, MSTP reduces the number of spanning tree instances required to support a large number of VLANs. Furthermore, load balancing is also possible with MSTP by providing multiple paths. In addition to this, the division of an Ethernet network into regions is also possible, which makes large networks more tractable by reducing the size of the spanning trees. Thus MSTP scales better than its ancestors but its convergence is not better than that of RSTP.

The properties of MSTP raise the idea of a fault tolerant approach that is based on MSTP. This idea is also applied in Viking system [6], where spanning trees are constructed such that there are at least two switching paths for any end-node pair in two different spanning trees, which do not share intermediate links or nodes. Each spanning tree instance corresponds to a particular VLAN, thus explicit selection of a VLAN results in implicit selection of a spanning tree. In case of failures end-nodes have to change the VLAN in order to select an alternate path. The failure detection is based on the support provided by network switches. Each switch in the network is configured to send SNMP traps to the Central Manager in case of failures. The Central Manager is a central server, which is responsible for the overall operation of the network including fault handling. After failure notification, the central server finds out which VLANs are affected and informs the end-nodes about the necessary reconfiguration in order to use the backup VLAN. Each of the end-nodes has to run a client module, which is responsible for VLAN selection during operation. Clients also invoke load measurements of which results are sent periodically to the Central Manager. Thus, there is a centrally co-ordinated traffic management using the constructed spanning trees. The failover time provided by this system is slightly below a second.

The calculation of spanning trees is widely examined in the literature. Calculation methods were typically developed for weighted graphs where the weights represent the cost of the links. A good summary of these methods is described in reference [7]. There are methods to find k link-disjoint spanning trees with the smallest cumulative weight in directed and undirected graphs. Link disjoint spanning trees are only needed if the whole tree needs to be backed up. If the backup is only for a part of the network then the needed trees are not necessarily link disjoint. A distributed method for finding k minimum spanning trees was described in reference [7]. The authors of reference [8] propose a method to find k spanning trees that are not necessarily disjoint but have minimal total cost such that a penalty is paid for the multiple use of a link.

Each of the existing methods, which are described in the references [6], [7] and [8], have the same disadvantage, that is they result in a great number of spanning trees because they construct link disjoint trees or minimum congestion trees. A great number of spanning trees is difficult to manage due to the limited number of VLAN IDs and the limited number of spanning tree instances that can be handled in existing equipments. A great number of spanning trees will also make network management more difficult.

SUMMARY OF THE INVENTION

The present invention is concerned with the abovementioned problem that with present methods a great number of spanning trees are required in a network to protect it against any single failure. The network in question can provide packet forwarding and resiliency based on the spanning trees.

A further problem is to take the type of network failure into consideration when the spanning trees are generated.

The problem is solved by firstly observing that for each network element there has to be at least one spanning tree that does not fall into two or more parts in case of the breakdown of that particular element. To protect the network against link failure this means that for each link there has to be at least one spanning tree that does not include that particular link. For node failure it means that for each node that transports traffic there has to be at least one spanning tree in which that particular node is an end node, a so called leaf, i.e. is a node which is connected to the spanning tree via a single link. Thus the solution includes a first phase in which spanning trees for handling link failures are generated. If also node failures are to be handled it is investigated in a second phase whether further spanning trees have to be generated.

Somewhat more in detail the problem is solved by, in a first phase, generating spanning trees to protect the network against link failure. If desired the network is also protected against node failure in a second phase, which may require that at least one spanning tree is added. The first phase includes successively connecting nodes in the first spanning tree until all the nodes of the network are connected to the tree. In this first spanning tree at least one link is left unconnected from every node if that is possible. A further spanning tree is generated which includes the unconnected links. Thus at least two spanning trees are generated to protect the network against any single link failure. It is then checked that for each link there is at least one spanning tree that does not include that particular link. If that requirement is not fulfilled at least one further spanning tree is generated in the first phase which tree does not include the link in question. In the second phase it is checked whether any node that generates traffic fulfils the requirement that it is an end node, a leaf, in at least one of the trees. If not so still at least one spanning tree is generated to fulfil the requirement.

A purpose with the invention is to generate only a relatively small number of spanning trees in a network, which trees can be used e.g. to protect the network against any single failure.

Another purpose is to first generate spanning trees, which make it possible to protect the network against any single link failure.

A further purpose is to also generate a spanning tree to protect the network against any single node failure.

Still a purpose is to generate the spanning trees off-line, i.e. before start up of the network.

An advantage is that the proposed method generates a low number of spanning trees for any network topology.

Still an advantage is that it can be selected if spanning trees for handling only link failures are to be generated or if spanning trees for also handling node failures are to be added.

A further advantage is that the spanning trees can be configured off-line in a network before it is started up.

Still another advantage is that the method is simple to implement.

The invention will now be described with the aid of preferred embodiments and with reference to the enclosed drawings.

DETAILED DESCRIPTION OF EMBODIMENTS

Figure 1:
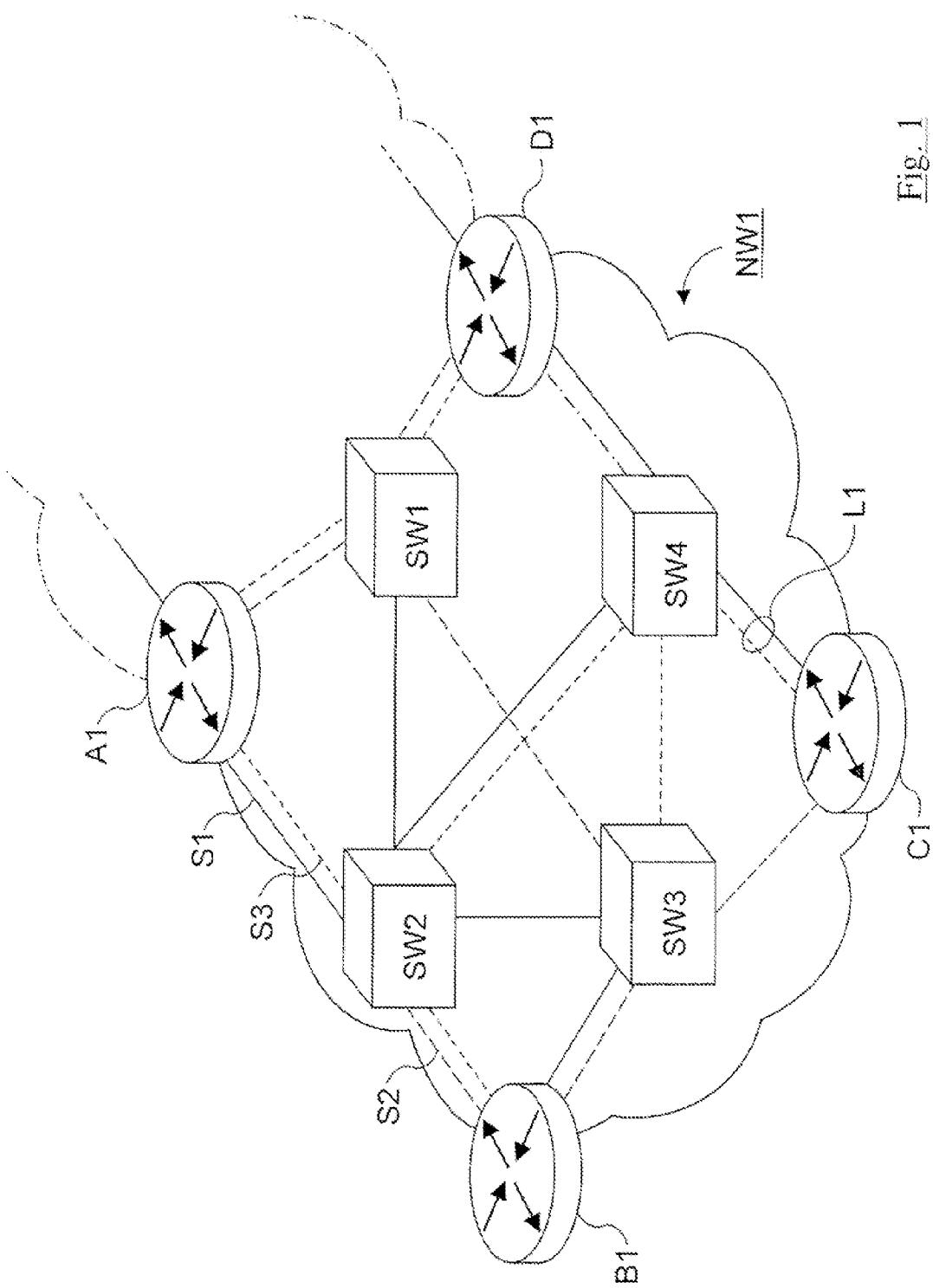
FIG. 1 shows a view over a network.

A method for configuration of spanning trees in networks is proposed which can be applied in e.g. Ethernet segments consisting of standard Ethernet switches available on the market. The extra functionalities that are needed for providing resiliency can be implemented in edge nodes of the Ethernet network, which are typically IP routers. FIG. 1 shows as an example a network NW1, in which the proposed method can be applied. The network has edge nodes A1, B1, C1 and D1 and also switch nodes SW1, SW2, SW3 and SW4 and all the nodes are interconnected by links L1. After configuring spanning trees S1, S2 and S3 by the proposed method, failure detection and traffic redirection, which are the so-called additional functionalities, can be invoked in edge nodes.

Multiple spanning trees can be generated for providing protection switching. Static spanning trees are configured in the network such that there remains at least one complete tree in the case of a single failure of any network element. As an example, a VLAN is assigned to each spanning tree, so traffic forwarding to a tree can be controlled with the help of VLAN IDs in the edge nodes. That is, in this example protection switching becomes VLAN switching in this network. In the example network NW1 shown in FIG. 1, all the three spanning trees S1, S2 and S3 are needed to handle any single failure. In the case of a failure each of the edge nodes A1, B1, C1 and D1 need to stop forwarding frames to the affected trees.

Before the configuration of port priorities in a network, a method is needed to generate a number of spanning trees that provide protection against single failures. The number of trees should be minimised due to the limited number of VLAN IDs (4096) and the implementation dependent limit on the number of spanning tree instances supported in Ethernet switches. Tree generating is invoked before configuration of port priorities for MSTP, so the proposed method does not need to be optimised for speed.

In the Ethernet network, VPN (Virtual Private Network) separation may be solved by VLANs. In this case multiple spanning trees may be reserved for each VLAN. In the worst case the number of VPNs multiplied by the number of spanning trees may give the total number of needed VLAN IDs. The reason for this is that traffic of VPNs need to be separated even at failures and each VPN requires as many VLANs as the number of needed spanning trees in the network. Note that a spanning tree instance can be assigned to several VLANs.

The proposed, novel method for the generation of static spanning trees determines a small number of spanning trees to solve fault handling. These trees have to be determined before the configuration of the network, so the proposed method is run off-line.

The construction of spanning trees is split up into two phases according to the two types of failures aimed to be handled. The first phase determines the spanning trees needed to protect against single link failures. The second phase determines the additional spanning trees needed for protecting against node failures after having the spanning trees for link failure. Each spanning tree for handling link failure connects all the nodes of a network.

The method generates spanning trees for a network and at least one of the spanning trees remains complete in case of the breakdown of any single network element. For this reason, the requirements for the spanning trees can be formulated in the following way for the two types of failures:

Link failure: For each link, there has to be at lest one spanning tree that does not include that particular link.
  Node failure: For each node, that transports traffic there has to be at lest one spanning tree where that particular node is a leaf, i.e. that node is connected to its spanning tree via a single link.

Figure 2:
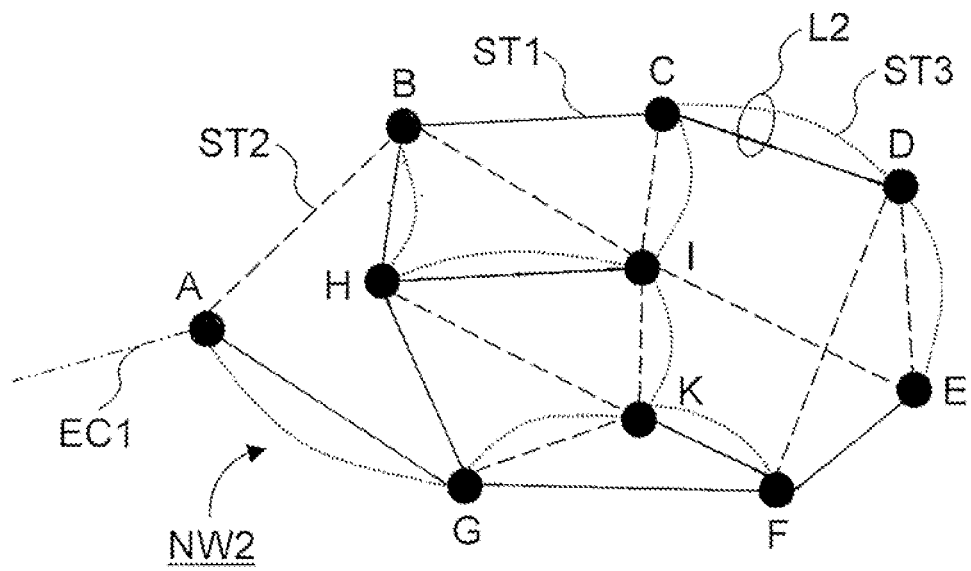
FIG. 2 shows a view over a network with a set of spanning trees.

If these requirements are fulfiled then there is for each failure at least one spanning tree that is not affected by a failure. Thus the traffic can be transmitted on this tree. FIG. 2 illustrates the requirements defined above. The figure shows a network NW2 with edge nodes A, B, C, D, E, F and G and also switch nodes H, I and K. The edge nodes A-G have external connections outside the network as is exemplified with a connection EC1 from node A. The nodes are interconnected by links L2 and three spanning trees ST1, ST2 and ST3 are set up in the network. Each of the spanning trees connects all the nodes. The spanning trees ST1 and ST2 are the ones that protect the network NW2 against link failure. As it can be seen none of the links L2 in the network NW2 is included in both the spanning trees ST1 and ST2, so the first requirement is met. However, the edge node B is not a leaf in either of the trees, i.e. the constraint for node failure is not met. If node B is broken down then node A cannot communicate with node C and node D via either of the spanning tree ST1 or ST2. Therefore a third spanning tree is needed where node B is a leaf, which is the spanning tree ST3 in FIG. 2. Thus, the example network NW2 is also protected against node failures.

Figure 3:
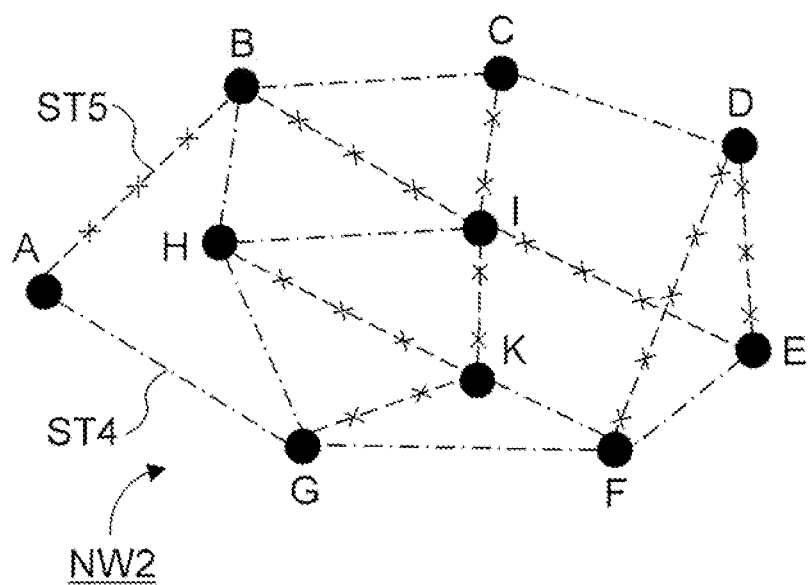
FIG. 3 shows a view over the network in FIG. 2 with an alternative set of spanning trees.

FIG. 3 shows the network NW2 with an alternative set of spanning trees ST4 and ST5. These spanning trees fulfil the above requirements for protection against link failures. The spanning trees ST4 and ST5 differ from the spanning trees ST1 and ST2. FIG. 3 demonstrates that different sets of spanning trees can be used to protect the same network against failure.

The two proposed method phases are described more in detail in the following. The first phase for link failures has to be invoked first and after that the second phase for node failures if desired. The method fulfils the requirements with a small number of spanning trees. It should be noted that at least for simpler networks, as e.g. the network NW2, it is possible to use the proposed method as described and exemplified above without going into all details of the method as described below.

Link Failure (First Phase)

In order to protect a network against link failure its topology has to be 2-connected and at least two spanning trees are needed. 2-connected means that cutting any of the links the network will not fall into two parts but remain connected. Two trees are only enough though if there are enough links to build up two link disjoint trees. However, this condition is typically not met in case of real network topologies hence typically more than two trees are needed. The proposed method tries to fulfil the requirement with two trees and applies additional trees only if needed. The construction of the first tree is very important as it determines the possibilities when building the latter trees. Therefore, the first tree strongly influences the number of trees needed to fulfil the requirements. In the embodiment the method first tries to construct a star-like tree beginning with the node having the highest degree and then always connects the neighbours having highest degree. It is very important that during the construction of the first tree the method tries to reserve at least one link from each node for the second tree. If it is not possible to reserve one link then two trees are not enough. The second tree is then based on the complement of the first one followed by further trees if needed.

Figure 5:
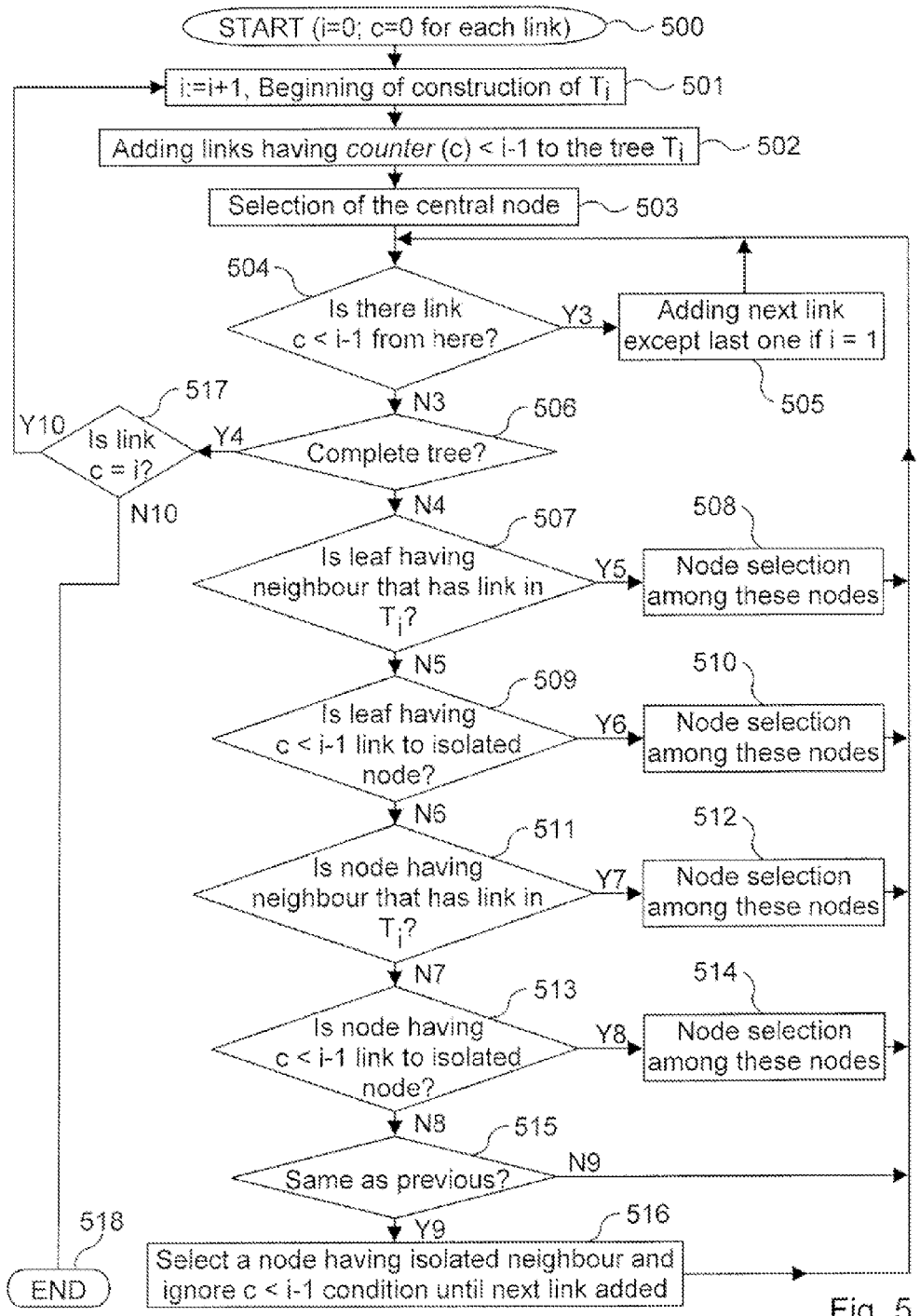
FIG. 5 shows a flowchart for link selection.

The flowchart of the first method phase that determines the spanning trees for link failure is depicted in FIG. 5. The spanning tree under construction is denoted by $T_i$, where i denotes the number of the tree. A counter c is assigned to each link in the network, which shows the number of spanning trees where the link is included. Thus, the previously described requirement for handling link failures can be formulated as c has to be less than i for each link. The following attributes are assigned to each node:

leaf: shows if there is a tree where the node is a leaf, i.e. it is connected to the rest of the network via a single link in any of the trees
  degree: the degree of the node, i.e. the number of physical links connected to the node, denoted by De
  usage: the ratio of the total number of links originating from the node in all trees and the degree of the node denoted by Us
  MAC: the smallest MAC address belonging to the node.

Nodes have to be selected based on the above attributes several times during the operation of the method. The submethod that selects a node is depicted in the flowchart in FIG. 4 which will be described first. Then the flowchart in FIG. 5 will be described.

The submethod starts in a step 40 and in a step 41 the node or first group G of nodes having the highest degree is selected. In a step 42 it is determined whether the found node is unique. If yes in an alternative Y1 the method ends in a step 46. If the node is not unique, alternative N1, it is selected a node or second group G2 of nodes among them having the smallest usage in a step 43. In a step 44 it is determined whether the node is now unique. If yes in an alternative Y2 the method ends in step 46. If not so in an alternative N2 the node having the smallest MAC address among them is selected. This selection is unambiguous and the submethod ends definitely in the step 46.

Figure 4:
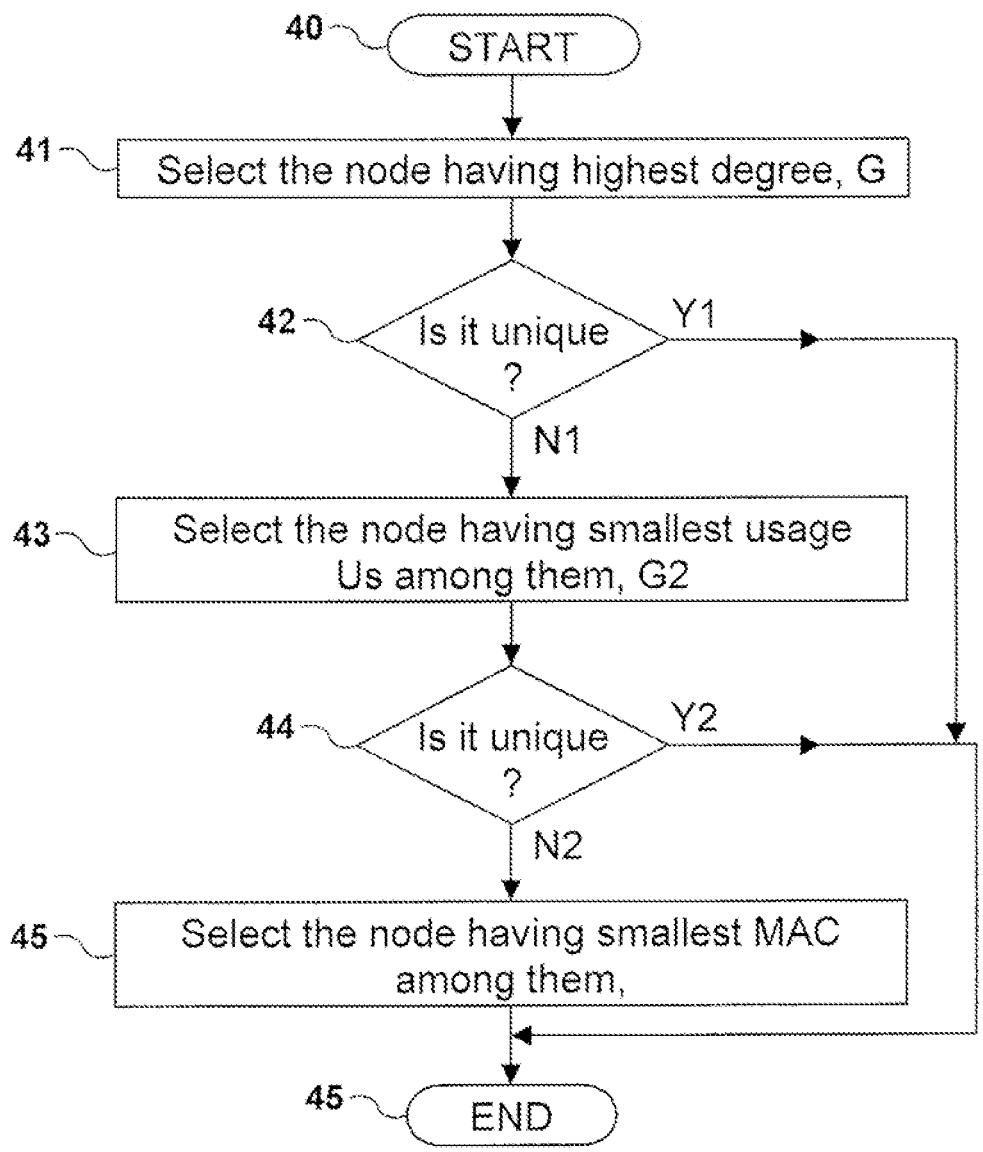
FIG. 4 shows a flowchart for node selection.

In FIG. 5 the first method phase starts in a step 500 in which the number of tree value i=0 and the counter c=0 for all links. In next step 501 the value i is increased by 1 and construction of the corresponding tree $T_i$ begins. Links for which the counter c<i−1 are added to the tree under construction in a step 502. If in this step i=1 (first tree) the expression c<i−1 has no meaning since it is defined that always c≧0. The step is then ignored. In a step 503 a central node is selected according to the submethod in FIG. 4. In a step 504 it is checked if there is any link from the selected node for which the link counter criterion c<i−1 is valid. If the criterion is fulfiled, an alternative Y3, next link is added in a step 505 and the link criterion is checked again in the step 504. If it is the first tree, i=1, at least one link is always saved for the next tree in the step 505. If the criterion c<i−1 in step 504 is not valid according to an alternative N3 it is checked in a step 506 whether the tree is complete. This criterion is c<1 for the first tree. If it is not, in an alternative N4, it is checked in a step 507 whether the central partly tree has a leaf node that has an isolated neighbour that has a link assigned to the tree $T_i$. Then the alternative Y5 and the node selection procedure shown in FIG. 4 is invoked and the links belonging to the node are examined according to step 504. Otherwise the alternative N5 is valid and it is checked whether a leaf of the partly tree has isolated neighbour. Alternative Y6 and one of these leaf nodes is selected in step 510 and the connection possibilities are examined in step 506. Otherwise alternative N6 is valid and the same are examined for non-leaf nodes of the partly tree. During these examinations it is stored which node was examined last. If the algorithm finds an examines the same node again and again in steps 507-513 then it is not possible to include a new link to the partly spanning tree considering the link criterion. Therefore, a node is selected in step 516 and a new link is included in step 505 such that step 504 is ignored for a single step. If in step 506 the tree is complete, an alternative Y4, then it is checked in a step 517 if the counter c=i. If it is so, according to an alternative Y10, a new tree must be constructed beginning with the step 501. If on the other hand c<i, according to an alternative N10, the first method phase ends in a step 518.

The operation of the method as described above is further commented in the following. As appears, first the so-called central node is selected for the spanning tree calculations according to the sub-method shown in FIG. 4. This central node is just the starting point of the tree constructions for all the trees, but otherwise the central node is not distinguished from other nodes. There is a special rule in the step 505 only taken into account during the construction of the first tree, that is, the method tries to reserve a link from each node for the second tree. If this is not possible then two trees are not enough. In case of further trees, first all links having smaller counter value c than the number of ready trees (i−1) are added to the new tree. If a node of the new tree is selected (the central node is the first one) then the links towards isolated nodes are added to the new tree, which is actually under construction, if they meet the link counter criterion c<i−1. Another leaf or node of the new tree is then selected and its isolated neighbours are tried to be connected. If no new link can be added to the tree insisting on the link counter criterion then a link is added ignoring this criterion. Another tree is then necessary to fulfil the above stated requirement for link failure. New links are added till the tree becomes complete and new trees are constructed until the requirement for link failure is met.

In connection with FIGS. 6-15 will be described an example on generating spanning trees intended for handling link failures in a 4×4 nodes grid network NW3. The selection of nodes and links follow FIGS. 4 and 5.

Figure 6:
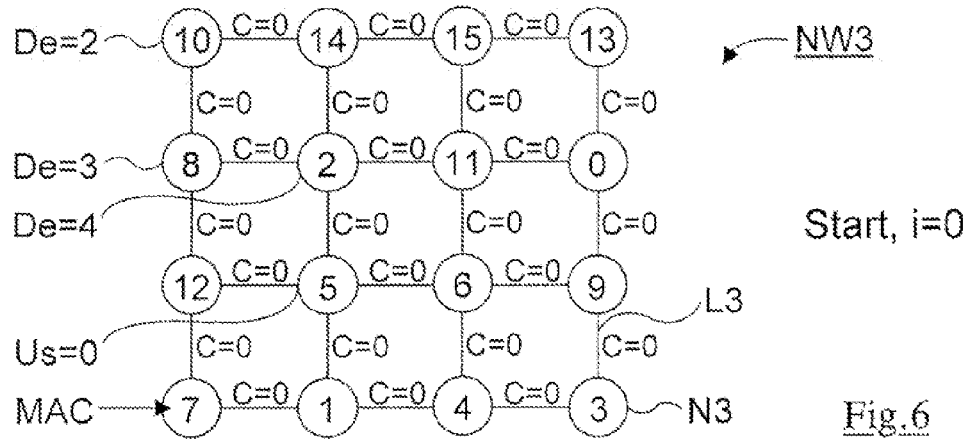
FIGS. 6-11 show views over a network and generation of the first spanning tree.

The network NW3, shown in FIG. 6, has sixteen nodes N3 interconnected by links L3. The nodes have numbers 1-16 denoting the MAC address for the respective node. These MAC addresses are also used as references to identify the nodes in the following description.

Figure 7:
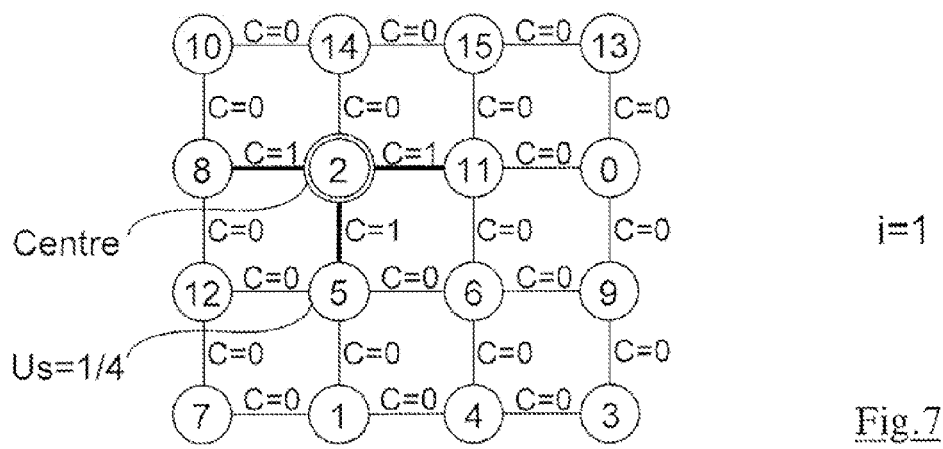
Figure 8:
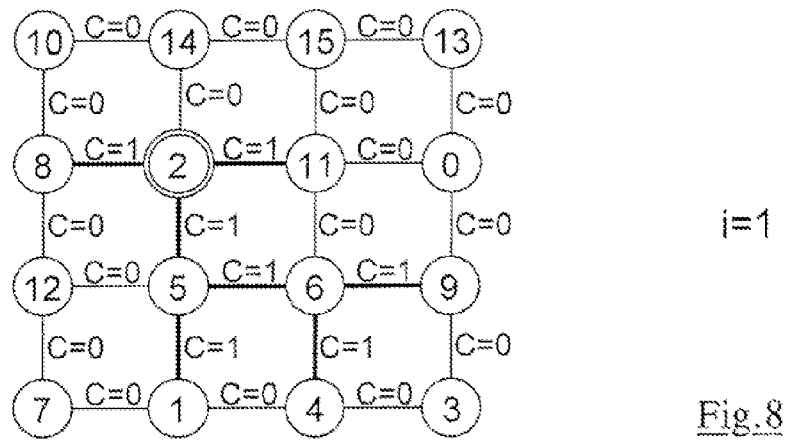
Figure 9:
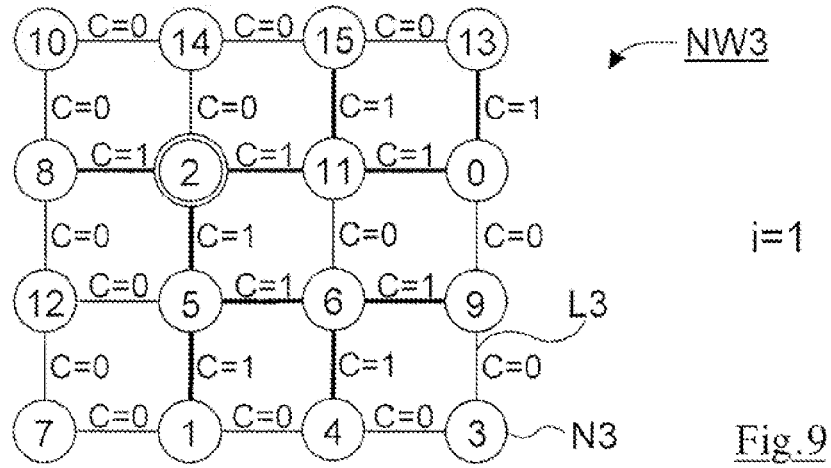
Figure 10:
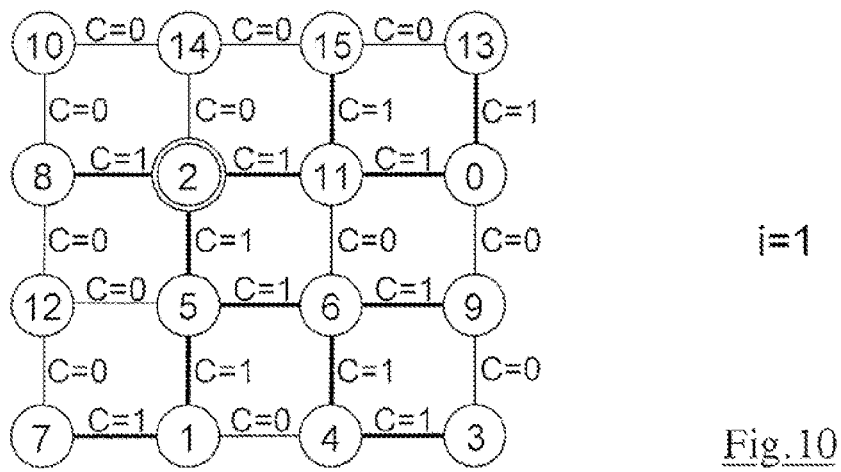
Figure 11:
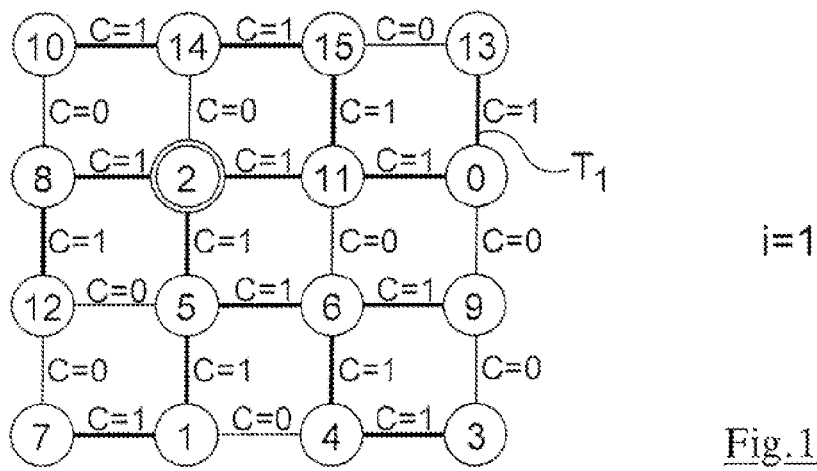

The tree construction starts in FIG. 5, step 500. Notice that from the beginning there is no tree, i=0, and the link counter is c=0 for all the links. In step 501 the number of the tree is set to i=1 and in step 502 nothing can be done since counter c<0 does not exist. In step 503 the central node is selected as shown in FIG. 7, the selection performed in accordance with FIG. 4. In step 41 the nodes 2, 5, 6 and 11 with the highest degree 4 are selected, in step 42 it is noticed that they all have the same degree and are not unique, alternative N1, and in step 43 it is also noticed that the all have the usage Us=0 since there is not yet any tree with links. They are therefore not unique in this respect either, according to step 44 alternative N2, but in step 45 the node 2 with the lowest MAC address is selected as central node. In step 504 the requirement c<0 has to be ignored, as above, but there are four links to the nodes 11, 14, 8 and 5 which can be added to the first tree $T_1$ from the central node 2 in step 505. According to FIG. 4, first links to the nodes 5 and 11 with the degree 4 are selected and then the link to the node 8 is selected, the node having the same degree 3 and usage Us=0 as node 14 but with the lowest MAC address 8. The link to the node 14 is not added according to the rule in step 505 for the first tree, i=1. Building of the first tree $T_1$ continues since the first tree is not complete, alternative N4 in step 506. According to the step 509 one of the nodes 8, 5, 11 has to be selected and the requirement c<0 is ignored as it is the first tree. According to FIG. 4, step 45, node 5 is selected as it has the same degree 4 and the same usage Us=¼ as node 11 but has the lowest MAC address. Back to step 504 a further link from node 5 has to be added according to the alternative Y3. In FIG. 8 this link is selected according to FIG. 4, step 41 and step 42 alternative Y1 to node 6 with the highest degree 4. The procedure with step 504 is repeated and in step 45 the link to the node 1 is added since node 1 has the same degree and usage as node 12 but lower MAC. The link to node 12 is not added according to step 505. The tree is not complete, alternative N4 in step 506. According to the step 509 (and c<0 is ignored) one of the nodes 8, 1, 6 and 11 has now to be selected. The node 6 with highest degree and lowest MAC is selected, step 41 and step 45. FIG. 8 also shows the successive selection of links from node 6 to the nodes 4 and 9 according to steps 504 and 505. The link to node 11 is excluded according to step 505. The first tree $T_1$ is not complete, step 506 alternative N4, and in FIG. 9 one of the nodes 8, 1, 4, 9 and 11 has to be selected according to step 509. According to step 41 and 42, alternative Y1, the node 11 is selected. From node 11 the links to nodes 0 and 15 are selected according to first step 504 and then step 45. Also the step 505 for i=1 is fulfilled. According to step 506, alternative N4, and step 509 one of the nodes 0, 15, 8, 1, 4 and 9 has to be selected. According to step 45 the node 0 is selected. The link to node 13 is then selected according to step 504 and step 41, 42 alternative Y1. Also this selection is shown in FIG. 9. Now turn to FIG. 10. In the same way as node 13 was connected to the first tree with its link the node 7 is connected from node 1 and then the node 3 is connected from node 4, keeping one link from every node unconnected. As shown in FIG. 11, the node 12 is connected via its link to node 8, node 14 is connected to node 15 and node 10 is connected to node 14. The three last nodes are connected in the described order and in the same way as the node 13. In the next step in the procedure it is observed that the first tree $T_1$ is ready according to step 506, alternative Y4. In step 517 it is stated that for all links c=i except for the links reserved in step 505. This means that the alternative Y10 in step 517 is valid and that next measure in the procedure is step 501, in which the tree number parameter is increased to i=2.

Figure 12:
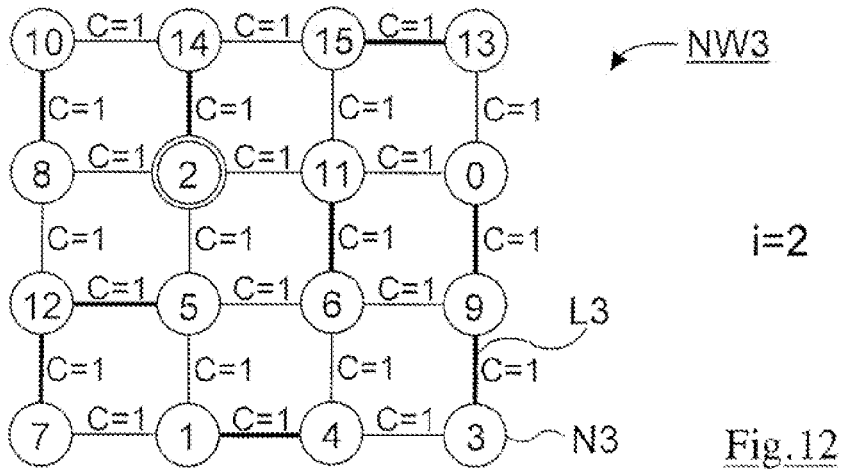
FIGS. 12-14 show views over the network and generation of the second spanning tree.
Figure 13:
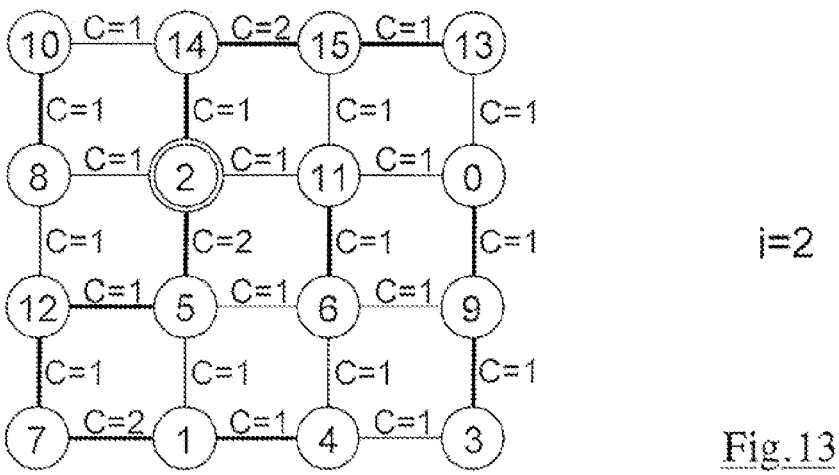
Figure 14:
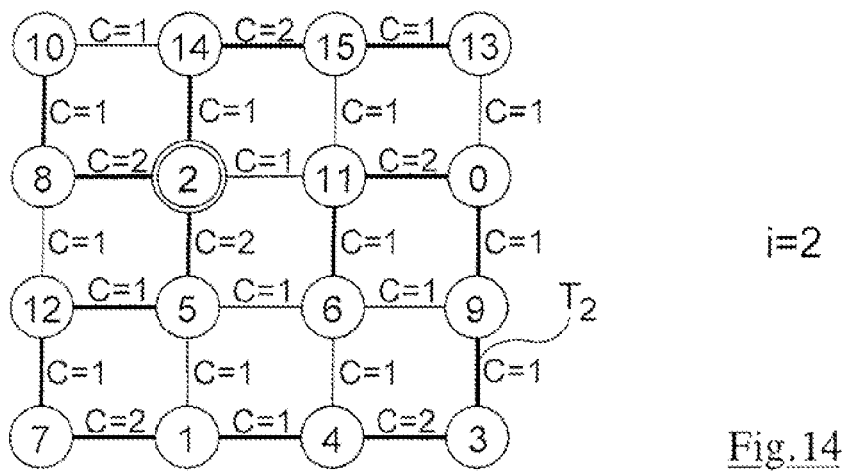

The construction of the second tree $T_2$ is shown in FIGS. 12-14. All the links which had the counter c<2-1, i.e. c=0, in FIG. 11 are added to the second tree, according to the step 502, and are shown in FIG. 12. According to the step 503 the central node is selected, which is performed in accordance with FIG. 4: the nodes 2, 5, 6 and 11 have all the degree 4 and the usage ¾. The node 2 is thus selected as central node according to step 45. In step 504 the alternative N3 is valid since all links from node 2 have the counter value c=2-1 and the tree is not ready so in step 506 the alternative N4 is valid. According to step 516 and 507 the link to node 5 is selected as shown in FIG. 13. This Figure also shows that the procedure of adding a link is repeated, steps 504, 506 and 516, and first the link between nodes 15 and 14 is added and then the link between the node 7 and the node 1 is added to the second tree $T_2$. In FIG. 14 is shown that the links between the nodes 4 and 3, nodes 0 and 11 and nodes 2 and 8 are successively added according to the steps 516, 507, 504, 505 and 511. When step 506 is applied again the alternative Y4 is valid since the second tree $T_2$ is complete. In step 517 at least one link is found which has the counter value c=2 and the alternative Y10 is valid. Still a tree must be constructed to make it possible to handle link failures.

Figure 15:
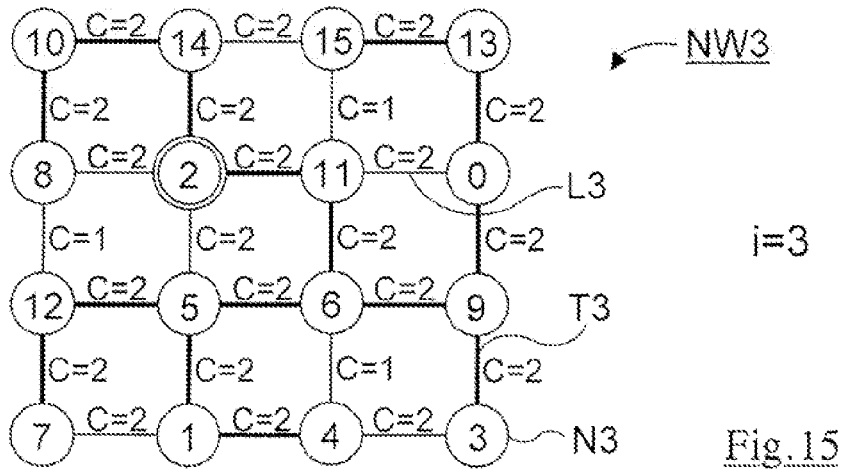
FIG. 15 shows a view over the network and generation of the third spanning tree.

The construction of the third tree is described in connection with FIG. 15. The construction begins in step 501 and the tree number is set to i=3. The link counter c up to now for the different links appears from FIG. 14. Links having the counter c<3-1=2, i.e. c=1, are to be added to the third tree $T_3$ according to step 502. The node 2 is selected as the central node just as before according to step 503 and the links are added according to the flowchart in FIG. 4. Thus those links are added which connect the nodes in the following sequence: node 11, 6, 5, 1, 12, 14, 4, 10, 8, 7, 9, 0, 13, 15 and 3. It is then checked in step 506 if the third tree $T_3$ is complete which is the case, so the alternative Y4 is valid. In step 517 the alternative N10 is valid since for all links the link counter C<3 and the tree construction for handling link failures is ready.

To determine the number of spanning trees needed to handle single link failures is a hard problem. Although, a rough estimation can be given for the average degree needed in a network to build up a given number of spanning trees. Let n denote the number of nodes in the network and k the number of desired spanning trees. If one would build up the network from link disjoint trees then the number of necessary links was:

$$e = k \cdot (n-1).$$

However, to fulfill our assumed requirements fewer trees are enough. The links are best utilised from spanning tree perspective, if all links are included in k−1 trees. Thus, the number of necessary links is reduced to:

$$e = \frac{k}{k-1}(n-1).$$

Thus, the minimum average degree, denoted by D, can be calculated as:

$$D = \frac{2 \cdot e}{n} = \frac{2 \cdot k \cdot (n-1)}{(k-1) \cdot n}. \quad (1)$$

If the average degree is D in a network then the constraint cannot be necessarily met with the help of k trees. This average degree is only a necessary condition, that is, D only shows the threshold below which it is not possible to fulfil the requirement with k trees in an n node network. The minimum of D is naturally 2 hence each node has to be connected at least by two links in the network in order to assure any type of resiliency. For instance, if someone wants to use 2 spanning trees in a 500-node network then the necessary average node degree is at least 4.

The lower limit for the number of necessary trees at a given number of nodes and links can then be calculated based on (1) the following way:

$$k = \frac{e}{e-n+1}. \quad (2)$$

This is a theoretical lower bound for the number of necessary spanning trees for handling link failure. Typically there need more trees because all links are generally can only be included in less than k−1 trees, which was our assumption during the above calculations.

Node Failure (Second Phase)

Figure 16:
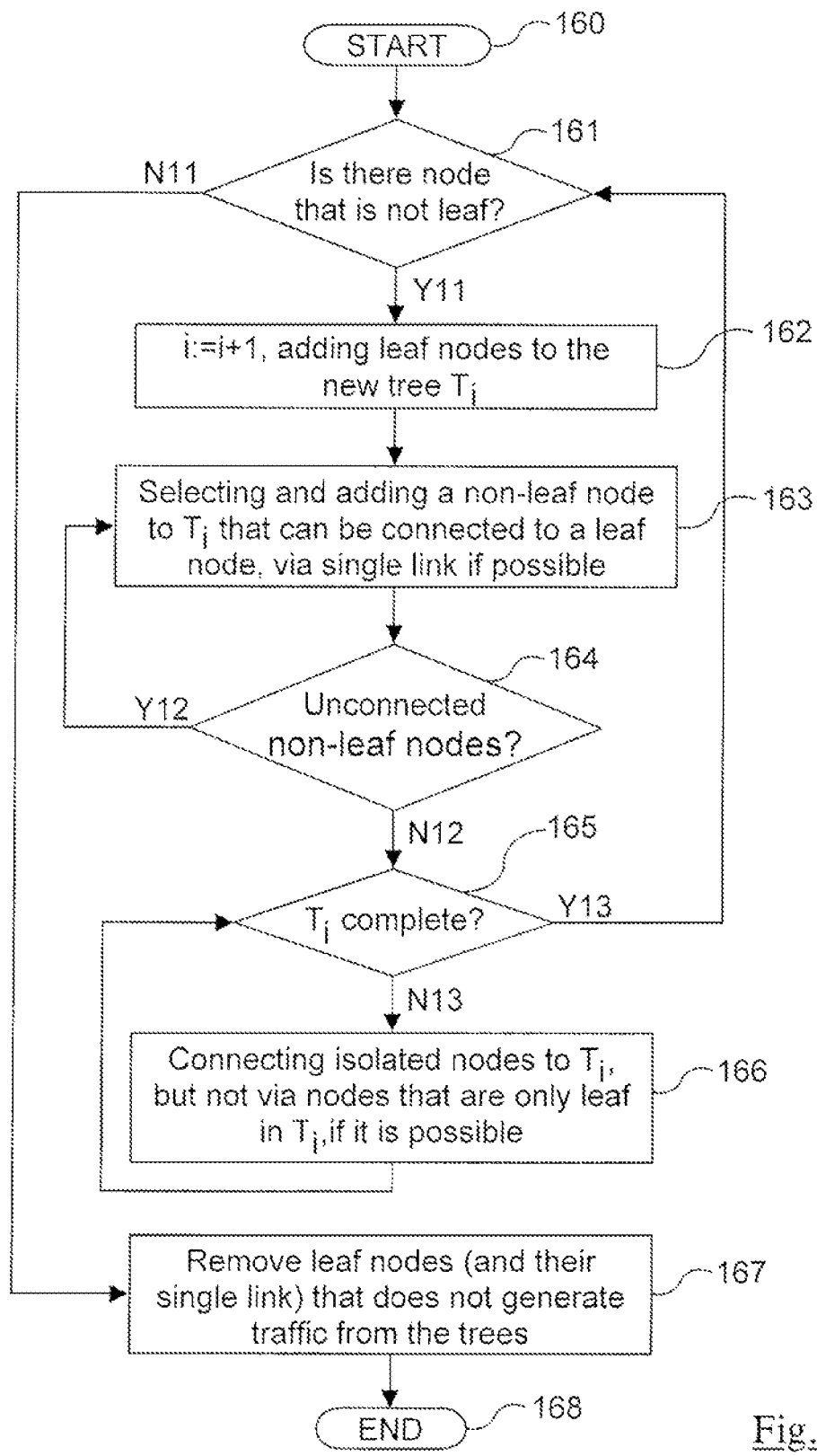
FIG. 16 shows a flowchart for generating spanning trees for handling node failures.

A simple method is proposed for determining the spanning trees needed to handle node failures, of which flowchart is shown in FIG. 16. This part of the method is invoked after the one for handling link failures shown in FIG. 5.

In FIG. 16 the method starts in a step 160. In a step 161 it is investigated if there is any node that is not a leaf in any of the trees, which are constructed until now. In an alternative Y11 the number of trees i is increased by one, i:=i+1, in a step 162. In this step also the present leaf nodes are added to the new spanning tree. In a step 163 a non-leaf node is selected which is to be added to the new tree. This non-leaf node is connected to an earlier leaf node if possible via a single link. In a step 164 it is investigated if there is any unconnected non-leaf node. In an alternative Y12 the step 164 is repeated and in an alternative N12 it is investigated in a step 165 if the new tree is complete. In an alternative Y13 the procedure from the step 161 is repeated. In an alternative N13 isolated nodes are connected to the present spanning tree. If it is possible these nodes are not connected via nodes which are leaf nodes only in the present spanning tree $T_i$. In the step 161 there is an alternative N11 if no further non-leaf node can be found. In that case leaf nodes and their single link are removed if the leaf node does not generate traffic from the trees, step 167. Examples on such nodes are the internal switch nodes SW1-SW4 in FIG. 1. The method ends in a step 168.

Figure 17:
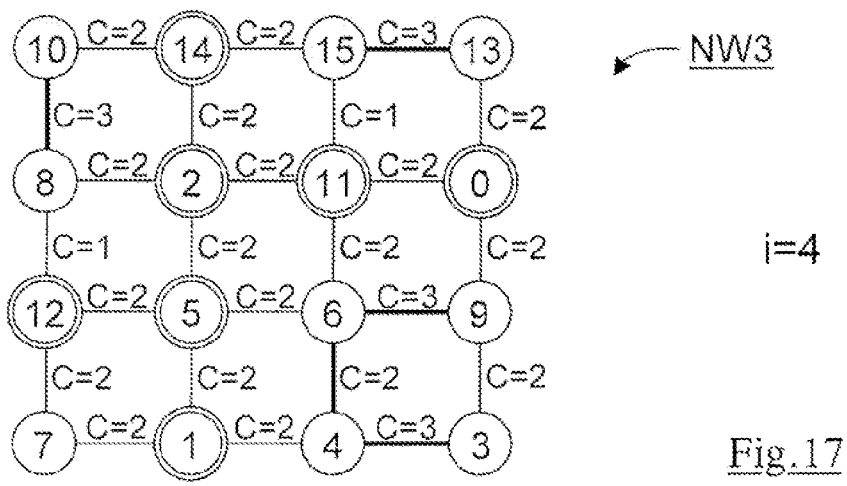
FIGS. 17-23 show views over the network and generation of a spanning tree for handling node failures.
Figure 18:
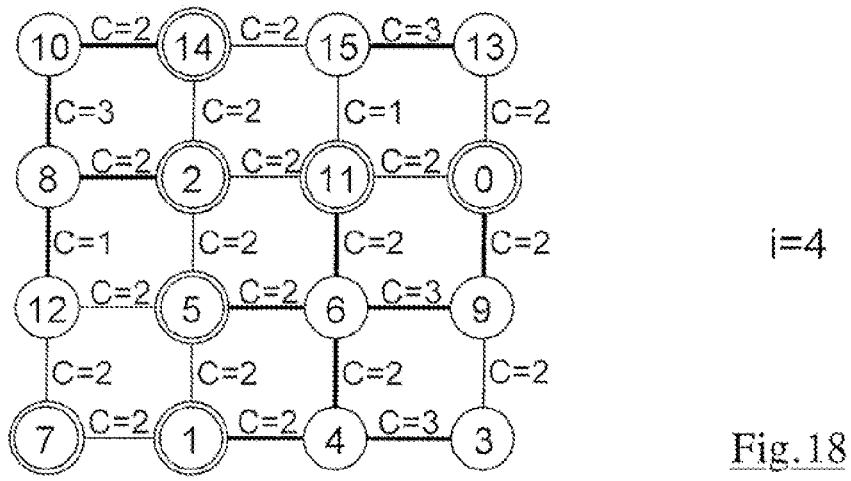
Figure 19:
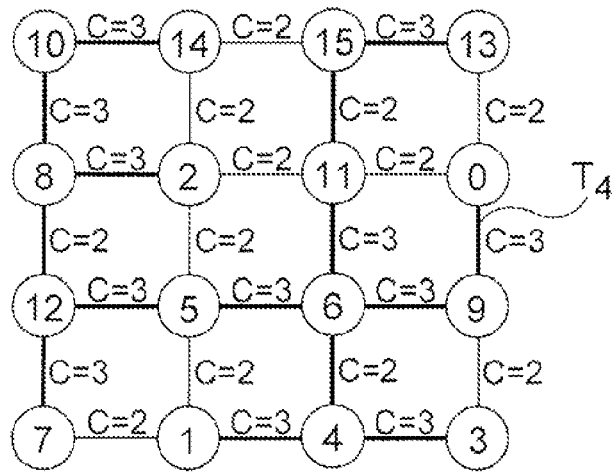
Figure 20:
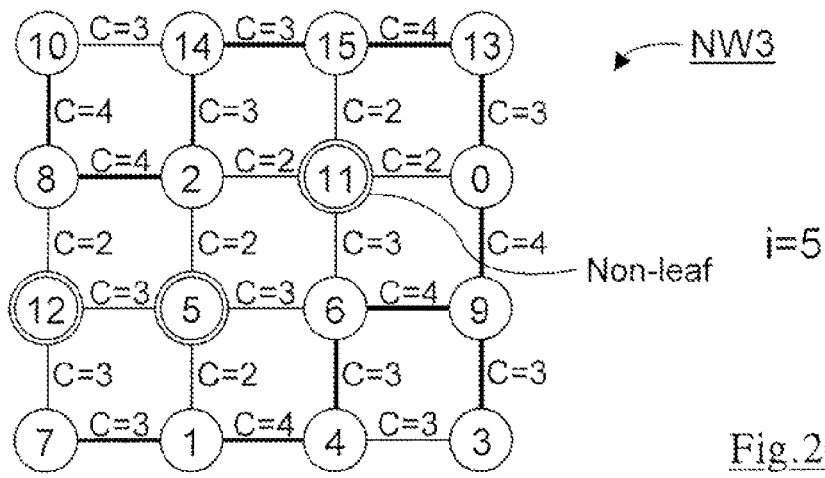
Figure 21:
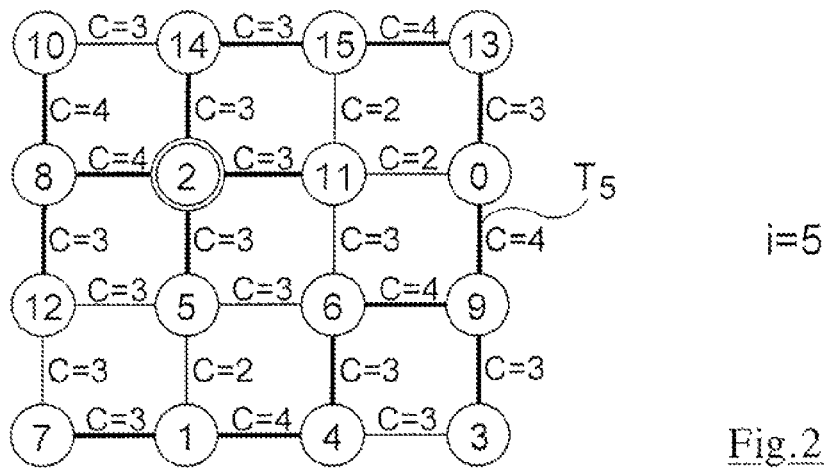
Figure 22:
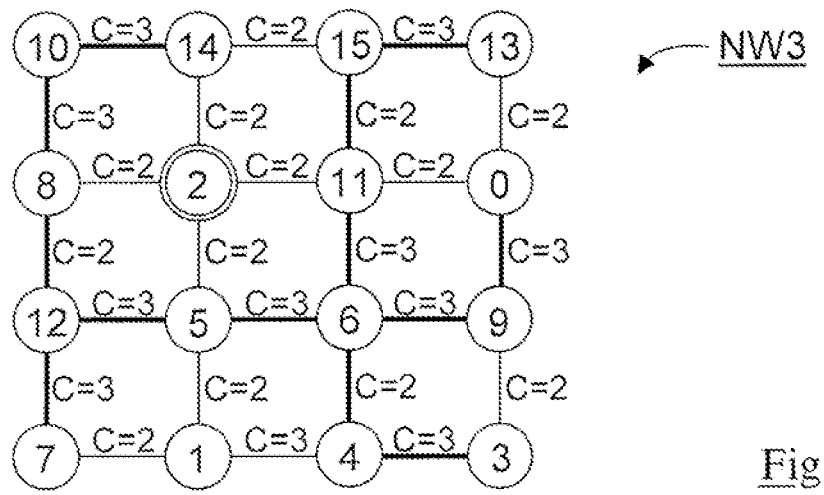
Figure 23:
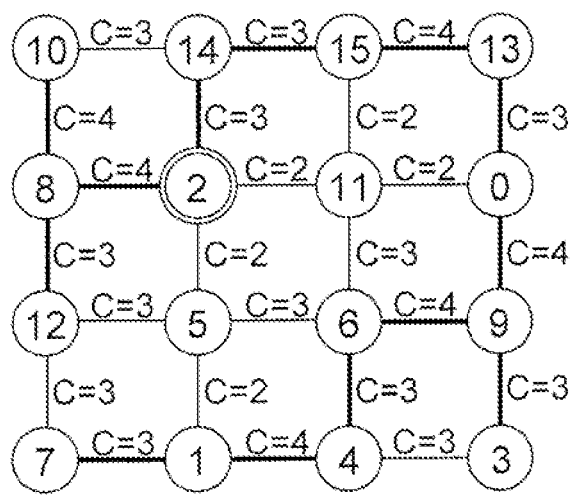

In connection with FIGS. 17-23 will be described an example on construction of node failure spanning trees for handling of node failures in the grid network NW3. Link failures in this network are handled by the spanning trees $T_1$, $T_2$, and $T_3$. It appears from the above description of the network NW3 that the nodes 0, 1, 2, 5, 11, 12 and 14 are non-leaf nodes. As described above, failures in such nodes cannot be handled with the aid of the spanning trees $T_1$, $T_2$, and $T_3$. The tree construction starts in step 161, alternative Y11, stating that there are non-leaf nodes. In step 162 all the nodes of the network NW3 but the non-leaf nodes 0, 1, 2, 5, 11, 12 and 14 are connected to a fourth spanning tree $T_4$ as shown in FIG. 17. In step 163 the node 0 is connected to node 9 and in step 164 it is found that the node 1 is unconnected. This node is connected in step 163 to node 4. This procedure is repeated until each of the non-leaf nodes is connected to a leaf node as shown in FIG. 18. It is then found in step 165 that the tree is not complete. In step 166 node 12 is connected to node 5 and node 7. FIG. 19 shows that the spanning tree $T_4$ is now complete, step 165 alternative Y13, but nodes 5, 11 and 12 are found to be non-leaf in step 161. Therefore a spanning tree $T_5$ is constructed according to steps 162-165. As shown in FIG. 20, first leaf nodes are added to the tree $T_5$. Then the non-leaf nodes are connected, FIG. 21. When the spanning tree $T_5$ is complete there is no further non-leaf node, step 161 alternative N11. Then node 2 is removed from the tree $T_4$, as shown in FIG. 22, and nodes 5 and 11 are removed from the spanning tree $T_5$, FIG. 23, all according to step 167. Construction of the spanning trees $T_4$ and $T_5$ is now finished and the network NW3 is protected also against node failures too.

There is an advantage of separating the calculation of spanning trees for handling the two types of failures, link and node failure. If one does not want to protect the network against node failures but only against link failures then it is enough to build up the spanning trees according to the output of the first method phase. Thus, the number of required VLANs can be reduced at the price of robustness.

Verification of Spanning Tree Calculation Methods

The above described method is based on heuristics because the problem it aims to solve is complex. The proposed method phases are for generic networks and they result in optimal or close-optimal solution in terms of the number of necessary spanning trees for any network. A numerical verification of the methods will be described below, which shows that they result in a close to optimal solution regarding the number of spanning trees.

First, the proposed method can be compared to the other similar approach proposed in [6], [7], which as far as could be found is the only similar one existing in the literature. The authors of [7] evaluated their method on grid topology. According to their method, the minimum number of spanning trees is 38 in an 8×8 grid, which consists of 64 nodes.

The present method described above results in 3 spanning trees for handling link failures in case of any size of grid. At most two more spanning trees are added by the method for avoiding the effect of node failures independently of the size of the grid. Thus, the present method needs only 5 spanning trees to have a resilient grid network of any size. For instance the method was run in a 50×50 grid where 5 trees are also enough to handle both link and node failures. The method results in four spanning trees for grid networks in some cases. In connection with FIGS. 6-15 and 17, 18 was described the output of the method for the 4×4 grid network NW3.

Grid is a network topology having good connectivity among the nodes because the degree of all nodes is 4 except for 4 nodes in the corner whose degree is only 2 and the winger nodes whose degree is only 3. Thus the average node degree is close to 4 but never reaches 4. Therefore, 2 spanning trees are not enough but 3 are needed to make grids of any size resistant against link failure according to Equation (1). The first method phase for link failures provides this theoretical minimum. By adding two more spanning trees the grid is also made resistant against node failures.

Figure 24:
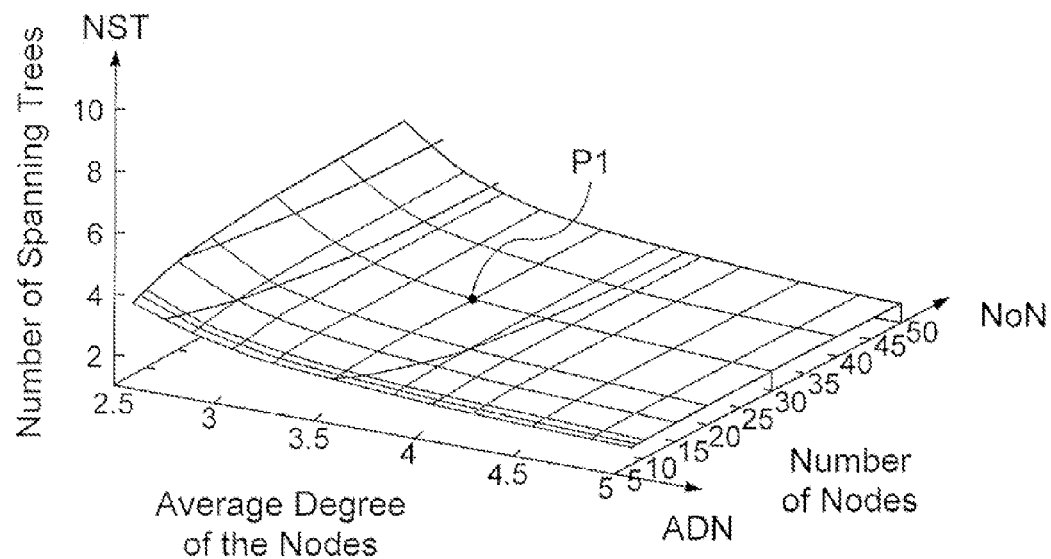
FIG. 24 shows a three-dimensional diagram over necessary number of spanning trees.
Figure 25:
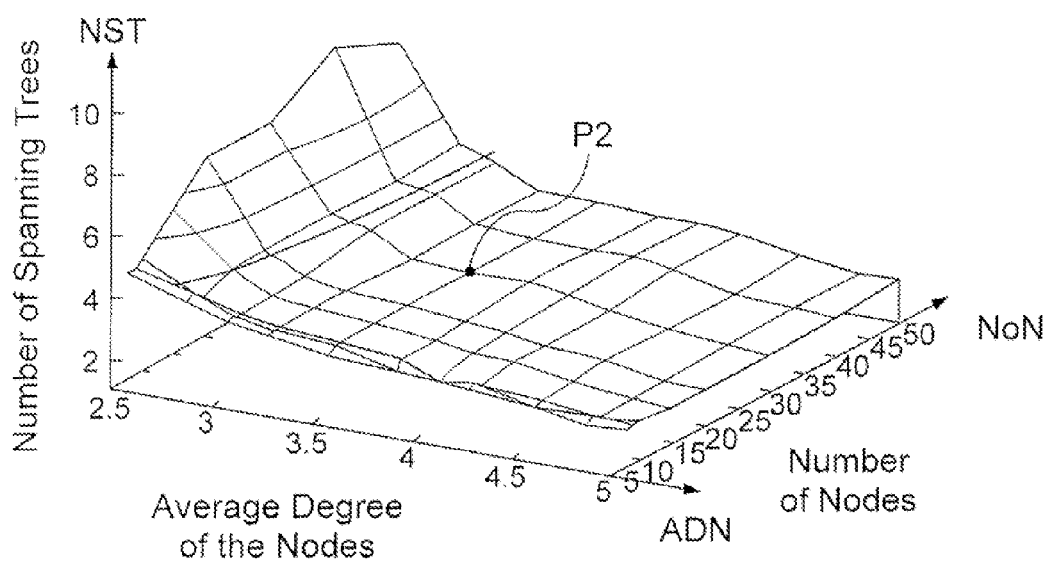
FIG. 25 shows a three-dimensional diagram over the number of spanning trees for handling link failure.
Figure 26:
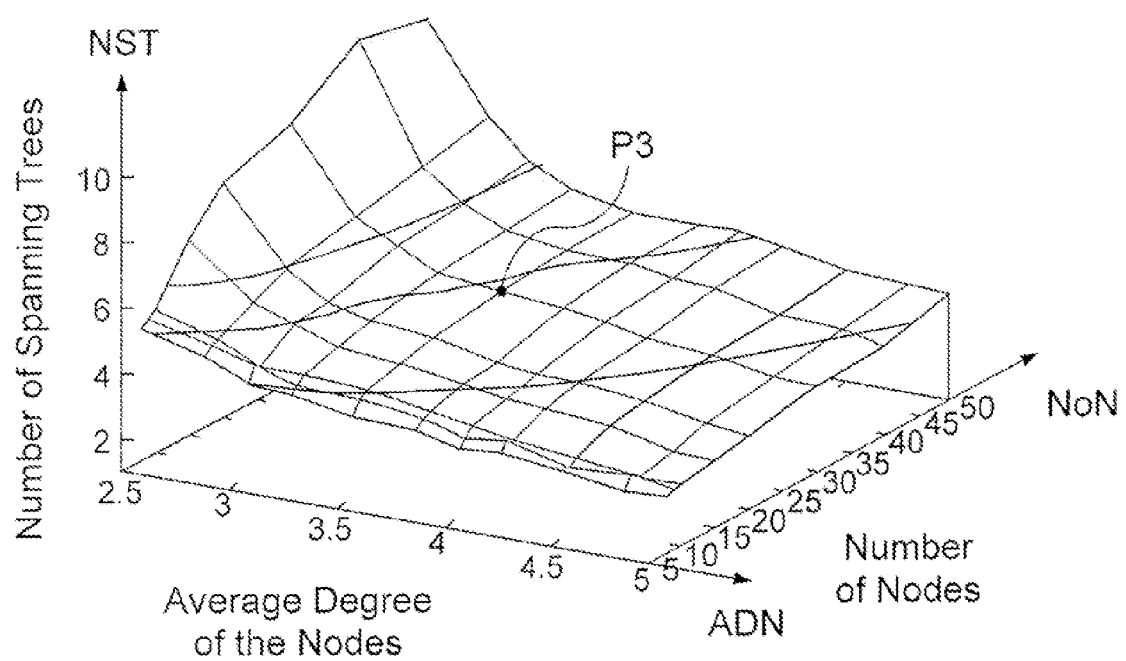
FIG. 26 shows a three-dimensional diagram over the number of spanning trees for handling node failure.

The proposed method is also verified on random networks, of which topology is random generated at given number of nodes and average node degree. The method is evaluated with several node and average degree settings, 50 simulations for each setting. FIG. 24, FIG. 25 and FIG. 26 show the number of necessary spanning trees. These figures show each a three dimensional diagram with an average degree ADN of the nodes on a first axis and a number NoN of nodes on a second axis. The result is a surface which indicates a number NST of spanning trees. The theoretical lower bound for link failures calculated from the necessary condition (Equation (2)) is seen in FIG. 24. The average of the 50 results calculated by the present method is shown for link failures in FIG. 25 and for node failures in FIG. 26. The number of spanning trees depends on the network size and the average degree of the nodes in the network.

It can be seen in FIGS. 24-26 that the method for link failure results in numbers close to the theoretical minimum. For example, in case of networks consisting of 30 nodes whose average degree is 3.5, a point P1 in FIG. 24, the theoretical minimum for handling link failure is NST=2.85. The present first method phase for link failures provides a value NST=3.08 in a point P2 of FIG. 25 and the second method phase for node failures provides a value NST=4.92 in a point P3 of FIG. 26. This shows that the present method provides a close-optimal solution. The number of additional spanning trees for handling node failure does not increase significantly the total number of spanning trees, therefore, it is also close to optimal.

Above has been referred to the following references:

[1] IEEE 802.1d, Standard for local and metropolitan area networks—Media access control (MAC) bridges.

[2] IEEE 802.1w, Standard for local and metropolitan area networks—Rapid reconfiguration of spanning tree.

[3] E. Shah, "Ethernet automatic protection Switching", RFC3619, October 2003.

[4] IEEE 802.1q, Standard for local and metropolitan area networks—Virtual bridged local area networks.

[5] IEEE 802.1s, Standard for local and metropolitan area networks—Multiple spanning trees.

[6] S. Sharama, K. Gopalan, S. Nanda and T. Chiueh, "Viking: A multispanning-tree Ethernet architecture for metropolitan area and cluster networks", INFOCOM 2004.

[7] A. Young et al., "Overlay mesh construction using interleaved spanning trees", INFOCOM 2004, March 2004.

[8] R. F. F. Werneck, J. C. Setubal and A. F. Conceicao, "Finding minimum congestion spanning trees", ACM Journal of Experimental Methods, 2000.

The invention claimed is:

1. A method of generating spanning trees in a network, the network including a plurality of nodes interconnected by links, the method comprising the steps of:

generating a first spanning tree, which connects all of the plurality of network nodes, wherein at least one link is left unconnected from a predetermined portion of the nodes;

generating a second spanning tree, which connects all of the plurality of network nodes and which includes the links that were left unconnected in the first spanning tree; and determining for each link, whether one of the trees is excluded from the link;

wherein the steps of generating the first and second spanning trees includes:

selecting one of the nodes as a central node;

selecting neighboring nodes that neighbor the central node, and connecting them to the central node;

selecting further nodes and connecting them to the earlier connected neighboring nodes; and repeating the step of selecting further nodes until all of the plurality of network nodes are connected;

wherein the steps of selecting neighboring nodes and further nodes includes:

defining a node degree (De) as the number of physical links connected to the node;

selecting a first group (G) of nodes having a degree of the highest value among the degrees of all the nodes;

selecting the only member of the first group given that the first group has only one member;

defining a node usage value (Us) as a ratio of the total number of links originating from the node in all the trees and the degree (De) of the node;

selecting, when the first group (G) has more than one member, a second group (G2) to be the members of the first group (G) having the smallest usage value (Us);

selecting the only member of the second group (G2) given that the second group has only one member; and selecting, when the second group (G2) has more than one member, the member of the second group (G2) having the smallest MAC address.

2. The method according to claim 1, wherein the predetermined portion of the nodes includes all of the plurality of network nodes.

3. The method according to claim 1, wherein the predetermined portion of the nodes includes a Virtual Private Network (VPN).

4. The method according to claim 1, further comprising:
a) determining at least one of the links in which all of the spanning trees are included;
b) generating a further spanning tree for which at least one of the links determined in step a) is excluded; and
c) repeating the determining step a) and the generating step b) until all the links of the network are excluded from at least one of the generated spanning trees.

5. The method according to claim 1, wherein the step of selecting one of the nodes as the central node includes selecting the same node as the central node for both the first and second trees.

6. The method according to claim 1, further comprising:
a) defining a leaf as a node that is connected to the rest of the network via a single link in any of the spanning trees;
b) determining whether there is any node that is not a leaf;
c) when a non-leaf node is found:
   c1) generating a node failure spanning tree; and
   c2) connecting the non-leaf node to the node failure spanning tree via a single link.

7. The method according to claim 6, further comprising:
d) determining whether there is a further non-leaf node; and
e) when a further non-leaf node is found, connecting the further non-leaf node to the node failure spanning tree.

8. The method according to claim 6, further comprising removing a leaf node from the spanning tree if the leaf node does not generate traffic.

9. A method of generating spanning trees in a network, the network including nodes interconnected by links, wherein at least two different link-failure spanning trees are sequentially generated and wherein at least one link is left unconnected in each of the link-failure spanning trees, wherein the unconnected link in one of the trees is connected in at least one of the other link-failure spanning trees, the method further comprising the subsequent generation of a node-failure spanning tree, comprising the steps of:

determining whether any of the nodes in the network is not a leaf, wherein a leaf is a node that is connected to the rest of the network via a single link in any of the spanning trees;

generating the node-failure spanning tree when a non-leaf node is found; and connecting the non-leaf node to the node-failure spanning tree via a single link;

wherein a given node's node degree is the number of physical links connected to the given node, and the given node's node usage value is a ratio of the total number of links originating from the given node in all the trees and the degree of the given node, wherein the method further comprises:

selecting a first group of nodes having a node degree of the highest value among the node degrees of all the nodes;

selecting the only member of the first group given that the first group has only one member;

selecting, when the first group has more than one member, a second group to be the members of the first group having the smallest node usage value;

selecting the only member of the second group given that the second group has only one member; and selecting, when the second group has more than one member, a member of the second group having the smallest Media Access Control (MAC) address.

10. The method according to claim 9, further comprising:
identifying at least one of the links that is included in all of the spanning trees;
generating a further spanning tree from which at least one of the identified links is excluded; and
repeating the steps of identifying links and generating further spanning trees until all of the links in the network are excluded from at least one of the generated spanning trees.

11. The method according to claim 9, further comprising:
selecting one of the nodes as a central node for a predetermined one of the link-failure spanning trees;
successively selecting and connecting neighbor nodes to the central node;
selecting and connecting further nodes to the earlier connected nodes; and
repeated the selecting step until all the network nodes are connected in the predetermined link-failure spanning tree.

12. The method according to claim 11, wherein the same node is selected as the central node for the trees.

13. The method according to claim 9, further comprising:
determining whether there is a further non-leaf node; and
upon determining there is a further non-leaf node, connecting the further non-leaf node to the node-failure spanning tree.

14. The method according to claim 9, further comprising removing from the node-failure spanning tree, a leaf node that does not generate traffic.

* * * * *

UNITED STATES PATENT AND TRADEMARK OFFICE
CERTIFICATE OF CORRECTION

PATENT NO. : 8,483,097 B2  
APPLICATION NO. : 12/889636  
DATED : July 9, 2013  
INVENTOR(S) : Farkas et al.

Page 1 of 1

It is certified that error appears in the above-identified patent and that said Letters Patent is hereby corrected as shown below:

On the Title Page, in the Figure, delete " " and insert -- --, therefor.

In the Drawings

In Fig. 4, Sheet 3 of 13, delete " " and insert -- --, therefor.

In the Specification

In Column 5, Line 36, delete "lest" and insert -- least --, therefor.

In Column 5, Line 39, delete "lest" and insert -- least --, therefor.

Signed and Sealed this  
Twelfth Day of November, 2013

Teresa Stanek Rea  
*Deputy Director of the United States Patent and Trademark Office*